United States Patent
Bolton et al.

(10) Patent No.: US 10,848,189 B2
(45) Date of Patent: Nov. 24, 2020

(54) METHOD FOR CURING AND EMBEDDING AN ANTENNA IN A COMPOSITE PART

(71) Applicant: The Boeing Company, Chicago, IL (US)

(72) Inventors: Joseph A. Bolton, Newalla, OK (US); Keith D. Humfeld, Federal Way, WA (US)

(73) Assignee: The Boeing Company, Chicago, IL (US)

( * ) Notice: Subject to any disclaimer, the term of this patent is extended or adjusted under 35 U.S.C. 154(b) by 177 days.

(21) Appl. No.: 16/045,507

(22) Filed: Jul. 25, 2018

(65) Prior Publication Data

US 2020/0036405 A1 Jan. 30, 2020

(51) Int. Cl.
*H04B 1/08* (2006.01)
*B29C 70/30* (2006.01)
(Continued)

(52) U.S. Cl.
CPC .............. *H04B 1/082* (2013.01); *B29C 70/30* (2013.01); *B29C 70/545* (2013.01); *H01Q 1/28* (2013.01);
(Continued)

(58) Field of Classification Search
CPC ............ B29C 35/0266; B29C 35/0272; B29C 2035/0211; B29C 70/30; B29C 70/545; B29C 70/885; B29C 2793/0045; B29L 2031/3076; B29L 2031/3456; H01Q 1/28; H01Q 1/285; H01Q 1/286; H01Q 1/287;
(Continued)

(56) References Cited

U.S. PATENT DOCUMENTS 5,442,156 A 8/1995 Westerman et al.
8,073,298 B2 12/2011 Meidar et al.
(Continued)

FOREIGN PATENT DOCUMENTS

DE 102013010314 12/2014

OTHER PUBLICATIONS

Extended Search Report for European Patent Application No. 19183791.3 dated Dec. 18, 2019.

*Primary Examiner* — Peter Dungba Vo
*Assistant Examiner* — Joshua D Anderson
(74) *Attorney, Agent, or Firm* — Kunzler Bean & Adamson

(57) ABSTRACT

A method of making a part comprising stacking a plurality of uncured composite sheets to form an uncured composite stack. The method also comprises interposing a resistor wire between an adjacent two of the uncured composite sheets of the uncured composite stack. The method further comprises applying heat to the uncured composite stack externally of the uncured composite stack to at least partially cure the plurality of uncured composite sheets. The method additionally comprises transmitting an electric current through the resistor wire to generate heat, from the resistor wire, internally within the uncured composite stack to at least partially cure the plurality of uncured composite sheets. Applying heat to the uncured composite stack externally and generating heat internally converts the plurality of uncured composite sheets into a plurality of cured composite sheets and converts the uncured composite stack into a cured composite stack.

20 Claims, 7 Drawing Sheets

(51) Int. Cl.

| | | |
|---|---|---|
| *B29C 70/54* | (2006.01) | |
| *H01Q 1/28* | (2006.01) | |
| *H01Q 1/52* | (2006.01) | |
| *H04B 1/10* | (2006.01) | |
| *B29L 31/30* | (2006.01) | |

(52) U.S. Cl.
CPC ............... *H01Q 1/521* (2013.01); *H04B 1/10* (2013.01); *B29L 2031/3076* (2013.01); *H01Q 1/285* (2013.01)

(58) Field of Classification Search
CPC .... H01Q 21/0087; H04B 1/082; B32B 37/02; B32B 37/06; B32B 37/065; B32B 2038/0076
See application file for complete search history.

(56) References Cited

U.S. PATENT DOCUMENTS

| | | | |
|---|---|---|---|
| 2003/0062118 A1* | 4/2003 | Gerhard | ............ B29K 2307/04 156/274.4 |
| 2011/0122591 A1 | 5/2011 | Hucker et al. | |
| 2011/0260935 A1 | 10/2011 | Bortoin et al. | |
| 2014/0295125 A1* | 10/2014 | Arikawa | .................. B64C 1/12 428/63 |
| 2015/0306712 A1* | 10/2015 | Devasia | .................. B29C 73/34 29/402.21 |
| 2017/0301980 A1 | 10/2017 | Lavin et al. | |

\* cited by examiner

METHOD FOR CURING AND EMBEDDING AN ANTENNA IN A COMPOSITE PART

FIELD

This disclosure relates generally to parts made of composite materials, and more particularly to a method of curing composite materials of a part and embedding antennas in the part.

BACKGROUND

Composite materials are made of fibers suspended in a polymer matrix. The polymer matrix must be cured to harden the matrix and fix the fibers in the matrix. Accordingly, any part made of composite materials must be cured by, for example, applying heat to the composite materials. Uniformly curing the composite materials can be difficult because heat generated externally of the part using conventional techniques often results in temperature gradients and uneven curing within the part.

Some parts made of composite materials include antennas embedded in the parts. Embedding antennas in parts of a high-speed vehicle helps to reduce the drag acting on the vehicle. However, embedding antennas into composite parts adds an additional complex step to the part manufacturing process without improving other steps of the part manufacturing process.

SUMMARY

The subject matter of the present application has been developed in response to the present state of the art, and in particular, in response to the shortcomings of current methods of curing composite materials and embedding antenna in a part, that have not yet been fully solved by currently available techniques. Accordingly, the subject matter of the present application has been developed to provide a method and a vehicle that overcome at least some of the above-discussed shortcomings of prior art techniques. For example, disclosed herein is a vehicle made of a composite material with an embedded resistor wire that servers the dual purpose of helping to cure the composite material and forming an embedded antenna.

Disclosed herein is a method of making a part comprising stacking a plurality of uncured composite sheets to form an uncured composite stack. The method also comprises interposing a resistor wire between an adjacent two of the uncured composite sheets of the uncured composite stack. The method further comprises applying heat to the uncured composite stack externally of the uncured composite stack to at least partially cure the plurality of uncured composite sheets. The method additionally comprises transmitting an electric current through the resistor wire to generate heat, from the resistor wire, internally within the uncured composite stack to at least partially cure the plurality of uncured composite sheets. Applying heat to the uncured composite stack externally of the uncured composite stack and generating heat internally within the uncured composite stack converts the plurality of uncured composite sheets into a plurality of cured composite sheets and converts the uncured composite stack into a cured composite stack. The preceding subject matter of this paragraph characterizes example 1 of the present disclosure.

The resistor wire spans an entire length of the uncured composite stack. The preceding subject matter of this paragraph characterizes example 2 of the present disclosure, wherein example 2 also includes the subject matter according to example 1, above.

The method further comprises severing the resistor wire, in place between the adjacent two of the cured composite sheets of the cured composite stack, at a first location to define a first end of an antenna portion of the resistor wire. The antenna portion has a first length less than an entire length of the resistor wire. The preceding subject matter of this paragraph characterizes example 3 of the present disclosure, wherein example 3 also includes the subject matter according to any one of examples 1-2, above.

The first length corresponds with a predetermined frequency of a radio wave signal. The preceding subject matter of this paragraph characterizes example 4 of the present disclosure, wherein example 4 also includes the subject matter according to example 3, above.

Severing the resistor wire at the first location comprises drilling a first hole into the cured composite stack and through the resistor wire at the first location. The preceding subject matter of this paragraph characterizes example 5 of the present disclosure, wherein example 5 also includes the subject matter according to any one of examples 3-4, above.

The method also comprises filling the first hole with a plug made of an electrically non-conductive material. The preceding subject matter of this paragraph characterizes example 6 of the present disclosure, wherein example 6 also includes the subject matter according to example 5, above.

The method further comprises drilling a third hole into the cured composite stack up to the antenna portion of the resistor wire. The method also comprises inserting an electrical lead into the third hole. The method additionally comprises electrically coupling the electrical lead to the antenna portion. The method further comprises electrically coupling the electrical lead to a radio receiver. The preceding subject matter of this paragraph characterizes example 7 of the present disclosure, wherein example 7 also includes the subject matter according to any one of examples 5-6, above.

The method further comprises severing the resistor wire, in place between the adjacent two of the cured composite sheets of the cured composite stack, at a second location to define a second end of the antenna portion of the resistor wire. The preceding subject matter of this paragraph characterizes example 8 of the present disclosure, wherein example 8 also includes the subject matter according to any one of examples 3-7, above.

Severing the resistor wire at the second location comprises drilling a second hole into the cured composite stack and through the resistor wire at the second location. The preceding subject matter of this paragraph characterizes example 9 of the present disclosure, wherein example 9 also includes the subject matter according to example 8, above.

The antenna portion is a first antenna portion. The method further comprises severing the resistor wire, in place between the adjacent two of the cured composite sheets of the cured composite stack, at a third location to define a first end of a second antenna portion and at a fourth location to define a second end of the second antenna portion. The second antenna portion has a second length different than the first length. The first length corresponds with a first predetermined frequency of a radio wave signal. The second length corresponds with a second predetermined frequency of a radio wave signal, the second predetermined frequency being different than the first predetermined frequency. The preceding subject matter of this paragraph characterizes example 10 of the present disclosure, wherein example 10 also includes the subject matter according to any one of examples 8-9, above.

The method further comprises interposing a plurality of resistor wires between the adjacent two of the uncured composite sheets in a spaced apart manner relative to each other. The method also comprises transmitting the electric current concurrently through the plurality of resistor wires to generate heat, from the resistor wires, internally within the uncured composite stack to at least partially cure the plurality of uncured composite sheets. The preceding subject matter of this paragraph characterizes example 11 of the present disclosure, wherein example 11 also includes the subject matter according to any one of examples 1-10, above.

The method further comprises severing a first one of the plurality of resistor wires, in place between the adjacent two of the cured composite sheets of the cured composite stack, at a first location to define a first end of an antenna portion of the first one of the plurality of resistor wires. The antenna portion of the first one of the plurality of resistor wires has a first length less than an entire length of the resistor wire. The method also comprises severing a second one of the plurality of resistor wires, in place between the adjacent two of the cured composite sheets of the cured composite stack, at a third location to define a first end of an antenna portion of the second one of the plurality of resistor wires. The antenna portion of the second one of the plurality of resistor wires has a second length less than an entire length of the resistor wire and different than the first length. The preceding subject matter of this paragraph characterizes example 12 of the present disclosure, wherein example 12 also includes the subject matter according to example 11, above.

Further disclosed herein is another method of making a part comprising forming a cured composite stack comprising a plurality of cured composite sheets. The method of making a part also comprises interposing a resistor wire between an adjacent two of the cured composite sheets of the plurality of cured composite sheets. The method of making a part further comprises severing the resistor wire, in place between the adjacent two of the cured composite sheets of the cured composite stack, at a first location to define a first end of an antenna portion of the resistor wire. The antenna portion has a first length less than an entire length of the resistor wire. The first length corresponds with a predetermined frequency of a radio wave signal. The preceding subject matter of this paragraph characterizes example 13 of the present disclosure.

Severing the resistor wire at the first location comprises drilling a first hole into the cured composite stack and through the resistor wire at the first location. The preceding subject matter of this paragraph characterizes example 14 of the present disclosure, wherein example 14 also includes the subject matter according to example 13, above.

The method further comprises filling the first hole with a plug made of an electrically non-conductive material. The preceding subject matter of this paragraph characterizes example 15 of the present disclosure, wherein example 15 also includes the subject matter according to example 14, above.

Additionally disclosed herein is a vehicle comprising a cured composite stack comprising a plurality of cured composite sheets. The vehicle also comprises a resistor wire interposed between an adjacent two of the cured composite sheets of the plurality of cured composite sheets. The vehicle further comprises a first hole extending into the cured composite stack, from only one side of the cured composite stack, and through the resistor wire. The first hole defines a first end of an antenna portion of the resistor wire. The antenna portion is electrically isolated from any other portion of the resistor wire at least partially by the first hole. The antenna portion has a first length less than an entire length of the resistor wire. The vehicle also comprises an electrical lead electrically coupled to the resistor wire only at the antenna portion. The vehicle additionally comprises a radio receiver electrically coupled to the electrical lead. The preceding subject matter of this paragraph characterizes example 16 of the present disclosure.

The vehicle further comprises a plug, made of an electrically non-conductive material, filling the first hole. The preceding subject matter of this paragraph characterizes example 17 of the present disclosure, wherein example 17 also includes the subject matter according to example 16, above.

The vehicle further comprises a second hole extending into the cured composite stack, from only one side of the cured composite stack, and through the resistor wire. The second hole defines a second end of the antenna portion of the resistor wire. The antenna portion is electrically isolated from any other portion of the resistor wire by the first hole and the second hole. The preceding subject matter of this paragraph characterizes example 18 of the present disclosure, wherein example 18 also includes the subject matter according to any one of examples 16-17, above.

The first length corresponds with a predetermined frequency of a radio wave signal. The preceding subject matter of this paragraph characterizes example 19 of the present disclosure, wherein example 19 also includes the subject matter according to any one of examples 16-18, above.

At least one of the resistor wire comprises a plurality of antenna portions, electrically isolated from each other, and a plurality of electrical leads each electrically coupled to the resistor wire only at a corresponding one of the plurality of antenna portions. The plurality of electrical leads are electrically coupled to the radio receiver. Alternatively, or additionally, the vehicle comprises a plurality of resistor wires, spaced apart from each other and interposed between the adjacent two of the cured composite sheets of the plurality of cured composite sheets. Each of at least two of the plurality of resistor wires comprises a respective antenna portion. The preceding subject matter of this paragraph characterizes example 20 of the present disclosure, wherein example 20 also includes the subject matter according to any one of examples 16-19, above.

The described features, structures, advantages, and/or characteristics of the subject matter of the present disclosure may be combined in any suitable manner in one or more embodiments and/or implementations. In the following description, numerous specific details are provided to impart a thorough understanding of embodiments of the subject matter of the present disclosure. One skilled in the relevant art will recognize that the subject matter of the present disclosure may be practiced without one or more of the specific features, details, components, materials, and/or methods of a particular embodiment or implementation. In other instances, additional features and advantages may be recognized in certain embodiments and/or implementations that may not be present in all embodiments or implementations. Further, in some instances, well-known structures, materials, or operations are not shown or described in detail to avoid obscuring aspects of the subject matter of the present disclosure. The features and advantages of the subject matter of the present disclosure will become more fully apparent from the following description and appended claims, or may be learned by the practice of the subject matter as set forth hereinafter.

BRIEF DESCRIPTION OF THE DRAWINGS

In order that the advantages of the subject matter may be more readily understood, a more particular description of the subject matter briefly described above will be rendered by reference to specific embodiments that are illustrated in the appended drawings. Understanding that these drawings depict only typical embodiments of the subject matter and are not therefore to be considered to be limiting of its scope, the subject matter will be described and explained with additional specificity and detail through the use of the drawings, in which.

DETAILED DESCRIPTION

Reference throughout this specification to "one embodiment," "an embodiment," or similar language means that a particular feature, structure, or characteristic described in connection with the embodiment is included in at least one embodiment of the present disclosure. Appearances of the phrases "in one embodiment," "in an embodiment," and similar language throughout this specification may, but do not necessarily, all refer to the same embodiment. Similarly, the use of the term "implementation" means an implementation having a particular feature, structure, or characteristic described in connection with one or more embodiments of the present disclosure, however, absent an express correlation to indicate otherwise, an implementation may be associated with one or more embodiments.

Figure 1:
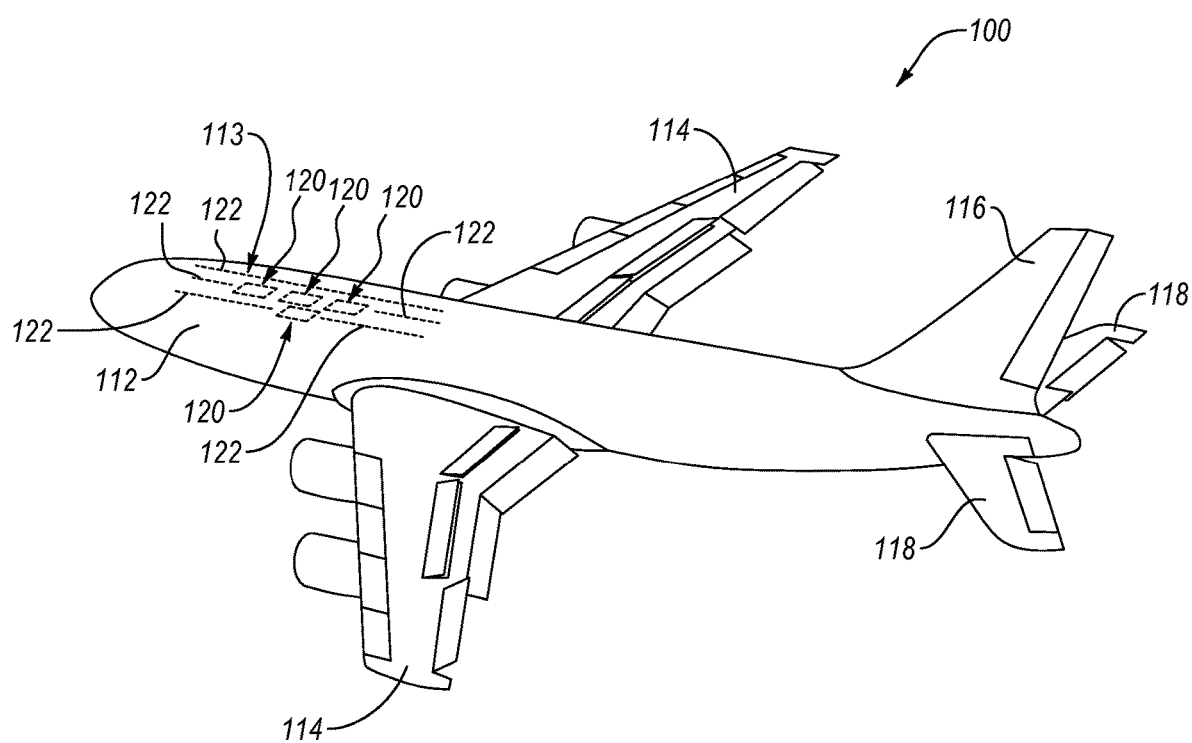
FIG. 1 is a perspective view of an aircraft, according to one or more examples of the present disclosure.

Referring to FIG. 1, one embodiment of an aircraft 100 is shown. The aircraft 100 can be any of various types of aircraft, such as commercial aircraft used for the transportation of passengers, military aircraft for military operations, personal aircraft, fighter jets, and the like. Moreover, although an aircraft is depicted in the illustrated embodiments, in other embodiments, another structure, such as a vehicle (e.g., helicopter, boat, spacecraft, automobile, etc.) or non-mobile complex structure (e.g., building, bridge, machinery, etc.), having a composite structure, can be used instead of the aircraft 100. Accordingly, the aircraft 100 is only one of many possible vehicles capable of utilizing the subject matter of the present disclosure.

The depicted aircraft 100 includes a fuselage 112, a pair of wings 114 coupled to and extending from the fuselage 112, a vertical stabilizer 116 coupled to the fuselage 112, and a pair of horizontal stabilizers 118 coupled to the fuselage 112 and/or the vertical stabilizer 116. As depicted, the aircraft 100 represents a passenger airplane. Any of various parts of the aircraft 100 include a composite structure. For example, the fuselage 112 of the aircraft 100 includes a part 113 that forms a skin or other structural component of the fuselage 112 of the aircraft 100. Like the fuselage 112, the wings 114, the vertical stabilizer 116, the horizontal stabilizers 118, and/or other portions of the aircraft 100 can include a composite structure, such as the part 113, that forms a skin or other structural component.

Figure 2:
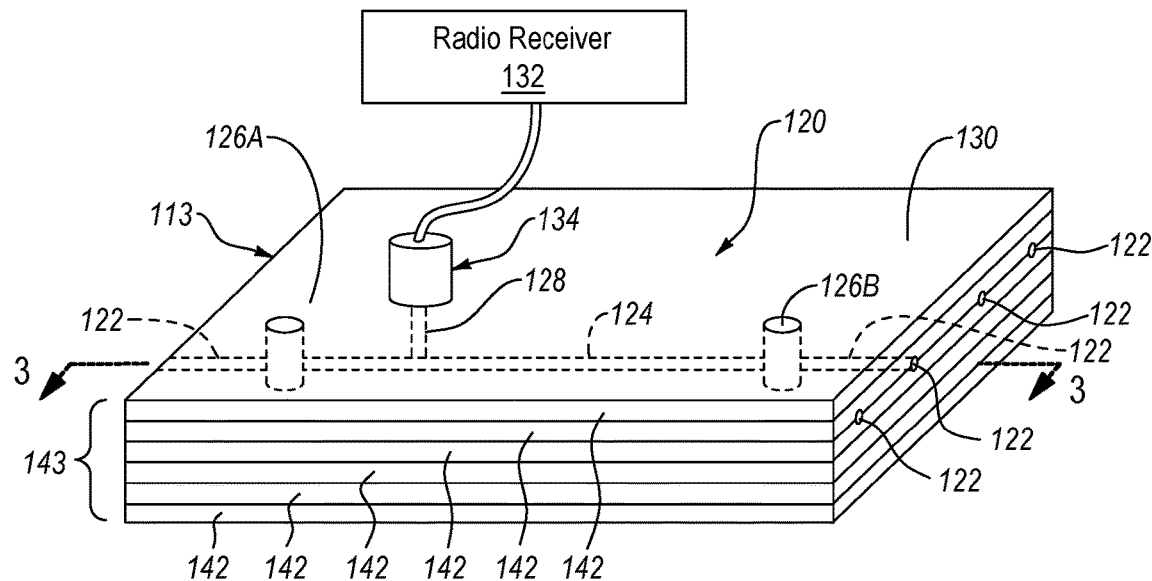
FIG. 2 is a perspective view of a part, according to one or more examples of the present disclosure.

Referring to FIG. 2, the part 113 includes a cured composite stack 143 that has a plurality of cured composite sheets 142. The cured composite sheets 142 of the cured composite stack 143 are laid up in a stacked formation (e.g., one on top of the other). Each cured composite sheet 142 is a sheet or ply made of a fiber-reinforced polymer. As defined herein, a fiber-reinforced polymer includes fibers embedded within a polymer resin. The fibers are unidirectional in some implementations and multi-directional in other implementations. The fibers can be any of various fibers, such as carbon fibers, glass fibers, and the like. Each fiber of the fibers is between about 5-20 micrometers in diameter and can have a length-to-diameter aspect ratio that, while length dependent, is conventionally greater than 10,000:1. In some implementations, each fiber has a diameter at least equal to or greater than 1 micrometer. Moreover, each fiber of the fibers has a planar or sheet-like atomic structure. The polymer resin can be any of various thermoset polymer resins or epoxies known in the art. As explained in more detail below, the fibers are embedded in the polymer resin when the polymer resin is in a pre-cured state. In the pre-cured state, the polymer resin is relatively soft, pliable, and flexible. As the polymer resin is cured, by heating the polymer resin to a cure temperature of the polymer resin, the polymer resin becomes hard and stiff, thus fixating the fibers in the resin. Moreover, curing the polymer resin also bonds together adjacent cured composite sheets 142 to form the cured composite stack 143.

According to one example where the fibers of each cured composite sheet 142 are unidirectional, for a given cured composite sheet 142, the fibers are unidirectional because each fiber is lengthwise parallel to a given direction. The direction of the unidirectional fibers of a cured composite sheet 142 is dependent on the orientation of the cured composite sheet 142 in the cured composite stack 143. To promote strength in multiple directions, the cured composite sheets 142 of the cured composite stack 143 are oriented relative to each other such that the unidirectional fibers of one cured composite sheet 142 are parallel to a direction that is different than the unidirectional fibers of any directly adjacent cured composite sheet 142.

The cured composite stack 143 includes at least two cured composite sheets 142. In the illustrated example, the cured composite stack 143 includes six cured composite sheets 142. In other examples, the cured composite stack 143 may include more or fewer than six cured composite sheets 142. Although not shown, in some examples, one or more additional plies or layers, such as a paint layer, a sealant layer, a protective coating, etc., are deposited onto the cured composite stack 143.

Although the part 113 and the cured composite stack 143 are shown to have a planar rectangular shape, in other examples, the part 113 and the cured composite stack 143 can be curved and/or have any of various shapes other than rectangular.

The part 113 can be oriented on the aircraft 100 such that the cured composite stack 143 of the part 113 has an inner surface 130 and an outer surface 131. The inner surface 130 is the innermost surface of the innermost cured composite sheet 142 of the cured composite stack 143. In contrast, the outer surface 131 is the outermost surface of the outermost cured composite sheet 142 of the cured composite stack 143. The inner surface 130 faces an interior of the aircraft 100 and the outer surface 131 faces an exterior of the aircraft 100.

The part 113 additionally includes at least one resistor wire 122 interposed between an adjacent two of the cured composite sheets 142 of the cured composite stack 143. The resistor wire 122 extends the entire length of the part. Moreover, the resistor wire 122 is made of any of various electrically-conductive materials with a relatively high resistance to electron flow. In one example, the resistor wire 122 is made of nickel or a nickel alloy. In other examples, the resistor wire 122 is made of iron or iron alloys. According to certain examples, the electrically-conductive material of the resistor wire 122 has a resistivity of between 1e-8 ohm-meters and 1e-6 ohm-meters. The resistor wire 122 can have various shapes and sizes. In one example, the resistor wire 122 has a circular-shaped cross-section. However, in another example, the resistor wire 122 has flat, planar shape or ribbon-like shape.

As shown in FIG. 1, the part 113 includes multiple resistor wires 122. At least one of the resistor wires 122 extends continuously along an entire length of the part 113. However, at least one of the resistor wires 122 is severed to form part of an antenna 120 embedded within the cured composite stack 143. In one example, one of the resistor wires 122 is severed in multiple locations to form corresponding parts of multiple antennas 120. In the illustrated example, the part 113 includes one continuous (e.g., non-severed) resistor wire 122, one resistor wire 122 severed once to form a single antenna 120, and one resistor wire 122 severed multiple times to form multiple antennas 120. It is noted that the resistor wires 122 and the antennas 120 of the part 113 of FIG. 1, as well as FIG. 2) are shown in dashed lines to indicate the resistor wires 122 and the antennas 120 are embedded in the part 113 interiorly of an outer surface of the aircraft 100. Further noted is that resistor wires 122 and the antennas 120 are shown schematically in FIG. 1, and thus are not necessarily shown to scale relative to the aircraft 100.

Figure 3:
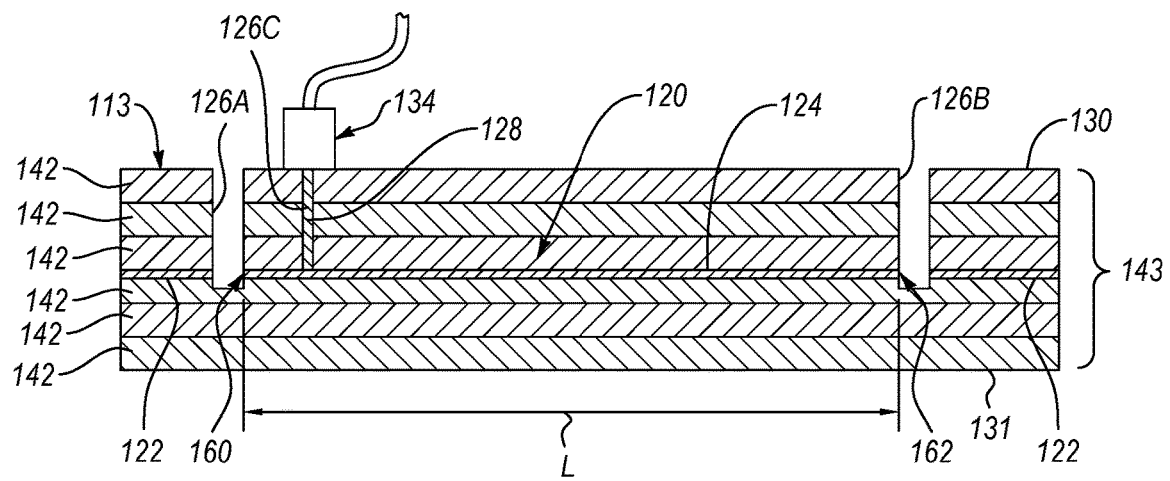
FIG. 3 is a cross-sectional side elevation view of the part of FIG. 2, taken along the line 3-3 of FIG. 2, according to one or more examples of the present disclosure.

Referring to FIGS. 2 and 3, the part 113 further includes a first hole 126A and a second hole 126B formed in the cured composite stack 143. The first hole 126A and the second hole 126B extend into the cured composite stack 143 and entirely through the resistor wire 122. Accordingly, the first hole 126A and the second hole 126B are spatially aligned with the resistor wire 122 so as to completely sever the resistor wire 122 at spaced-apart locations along the resistor wire 122 when the holes are formed in the cured composite stack 143. The first hole 126A and the second hole 126B extend from only one side of the cured composite stack 143. In other words, the first hole 126A and the second hole 126B initiate from one side of the cured composite stack 143 and terminate at some location beyond the resistor wire 122, but between the two opposite sides of the cured composite stack 143. According to the illustrated examples of FIGS. 2 and 3, the first hole 126A and the second hole 126B extend into the cured composite stack 143 from the inner surface 130, completely sever the resistor wire 122 at respective locations, and terminate at some location between the resistor wire 122 and the outer surface 131. Although less preferred, in some examples, the first hole 126A and the second hole 126B may be through-holes that extend entirely through the cured composite stack 143.

As shown in FIG. 2, the first hole 126A and the second hole 126B sever the resistor wire 122 at two spaced-apart locations so as to effectually separate an antenna portion 124 of the resistor wire 122 from the rest of the resistor wire 122. The physical separation of the antenna portion 124 from the rest of the resistor wire 122 by the first hole 126A and the second hole 126B also electrically isolates the antenna portion 124 from the rest of the resistor wire 122. The antenna portion 124 has a first end 160 and a second end 162, opposite the first end 160. Accordingly, the antenna portion 124 extends from the first end 160 to the second end 162. The first hole 126A defines the first end 160 of the antenna portion 124 and the second hole 126B defines the second end 162 of the antenna portion 124. The antenna portion 124 has a length L defined as the distance between the first end 160 and the second end 162. Because the antenna portion 124 is separated from the rest of the resistor wire 122, the length L of the antenna portion 124 is less than an entire length or the original length of the resistor wire 122. Therefore, after the antenna portion 124 is formed, at least one other portion of the resistor wire 122 remains.

The antenna 120 of the part 113 includes the antenna portion 124. Additionally, the antenna 120 includes an electrical lead 128 electrically coupled to the antenna portion 124 of the resistor wire 122. More specifically, the electrical lead 128 is electrically coupled to the resistor wire 122 only at the antenna portion 124. Accordingly, the electrical lead 128 is electrically isolated from the remaining portion(s) of the resistor wire 122 or any portion of another resistor wire 122. The antenna 120 further includes a connector 134 and a radio receiver 132. The connector 134 electrically couples the electrical lead 128, and thus the antenna portion 124, with the radio receiver 132. The electrical lead 128 can be made of any of various electrically-conductive materials. In one example, a third hole 126C is formed in the cured composite stack 143. The third hole 126C extends into the cured composite stack 143, from the inner surface 130, and up to, but not through in some examples, the antenna portion 124. The electrical lead 128 is positioned within the third hole 126C and placed into electrical contact with the antenna portion 124. The connector 134 can be any of various electrical connectors, such as a plug, receptacle, or the like. Furthermore, the connector 134 includes an electrical wire or cable to help facilitate an electrical connection between the electrical lead 128 and the radio receiver 132, which may be located a significant distance away from the electrical lead 128.

The radio receiver 132 is configured to detect a radio wave signal, received at the antenna portion 124, having a frequency corresponding with the length L of the antenna portion 124. The characteristics (e.g., wavelength, amplitude, etc.) of the detected radio wave signal are electrically transmitted to the radio receiver 132 via the electrical lead 128 and the connector 134. The radio receiver 132 may also be configured to extract information or data (e.g., communications) from the detected radio wave signal. Radio wave signals that do not have a frequency corresponding with the length L of the antenna portion 124 are not picked up well by the antenna portion 124 and thus the radio receiver 132 is not able to detect them. Accordingly, the length L of the antenna portion 124 is selected to pick up radio wave signals having a known or desired frequency. In other words, the locations along the resistor wire 122 at which the resistor wire 122 is severed by the first hole 126A and the second hole 126B are preselected such that the distance between the first hole 126A and the second hole 126B is equal to the length L corresponding with the known or desired frequency. Generally, the length L corresponds with the known or desired frequency by being a predetermined fraction (e.g., one-quarter, one-half, etc.) of the wavelength of the radio wave signal having the desired frequency.

Figure 4:
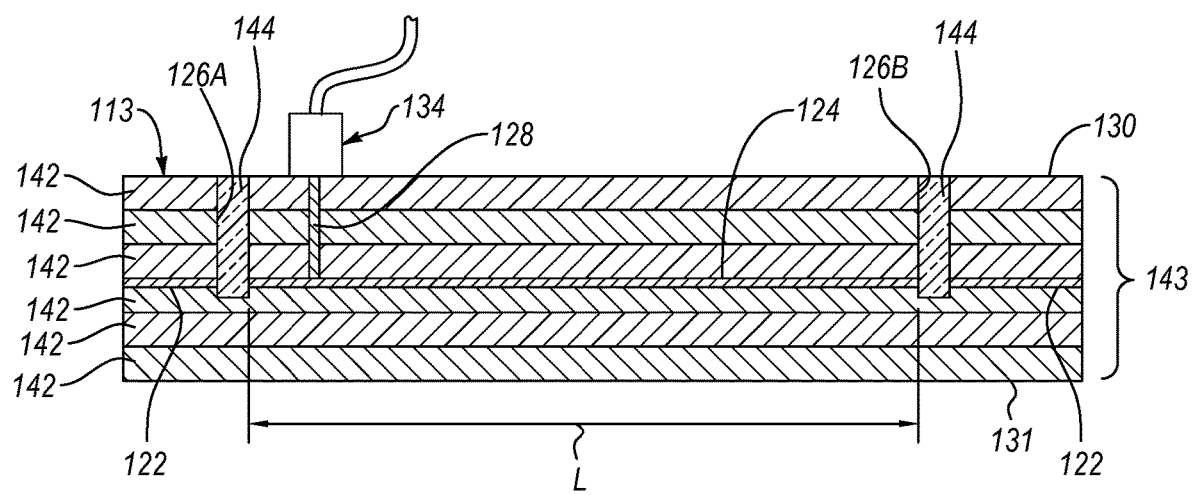
FIG. 4 is a cross-sectional side elevation view of a part, taken along a line similar to the line 3-3 of FIG. 2, according to one or more examples of the present disclosure.

Referring to FIG. 4, in some examples, the part 113 further includes plugs 144 each filling a corresponding one of the first hole 126A and the second hole 126B. The plugs 144 are made of an electrically non-conductive material. Moreover, the plugs 144 may be configured to seal the first hole 126A and the second hole 126B to prevent contaminants, such as debris and moisture, from entering the first hole 126A and the second hole 126B.

Figure 9:
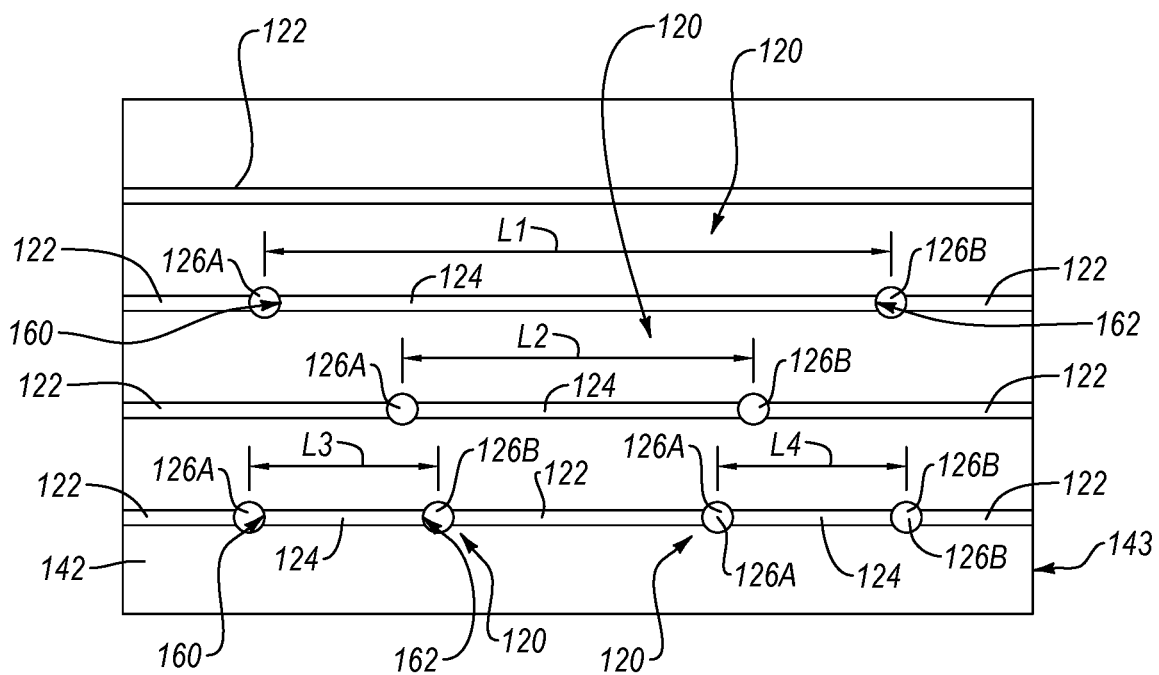
FIG. 9 is a top plan view of the part of FIG. 3, shown with cured composite sheets on one side of the resistor wire removed for convenience, according to one or more examples of the present disclosure.

As shown in FIG. 9, the part 113 may have multiple antennas 120 with antenna portions 124, spaced apart from each other, between the same adjacent two of the cured composite sheets 142 of the cured composite stack 143. Such antennas 120 can be defined as co-planar antennas 120 because their antenna portions 124 are located on the same plane of the cured composite stack 143. The antenna portion 124 of each of the multiple antennas 120 is defined between a corresponding pair of a first hole 126A and a second hole 126B. Accordingly, the antenna portion 124 of each of the multiple antennas 120 has a length L equal to the distance between the corresponding pair of the first hole 126A and the second hole 126B. In one example, the length L of the antenna portion 124 of any one of the antennas 120 is different than the length L of the antenna portion 124 of any other of the antennas 120. In this manner, the antenna system is configured to separately receive and detect multiple radio wave signals having different frequencies.

Although not shown, the part 113 may have multiple antennas 120 with each of the antenna portions 124 being between a different adjacent two of the cured composite sheets 142 of the uncured composite stack 143. In other words, the antenna portions 124 are located on different planes of the cured composite stack 143. The antennas 120 of the antenna system of this type can be considered stacked antennas. Moreover, the antenna portion 124 of each of the multiple antennas 120 can have a different length L relative to the other antennas 120.

In some examples, where the antenna portion 124 is proximate an end of the part 113, the antenna portion 124 can be defined by a single hole, such as the first hole 126A. More specifically, the first end 160 of the antenna portion 124 can be defined by the first hole 126A and the second end 162 of the antenna portion 124 can be defined by the end of the part 113, which coincides with the end of the resistive wire 122.

As described above, a portion of the resistor wire 122 forms an antenna 120 embedded within the cured composite stack 143. However, other portions of the resistor wire 122 remain embedded within the cured composite stack 143 and do not form an antenna. These portions of the resistor wire 122 add weight to the aircraft 100 and thus may be considered an undesirable way to embed an antenna within a cured composite stack 143 of a part 113 of an aircraft 100. However, according to the present disclosure, the resistor wire 122, prior to being severed to form an antenna portion 124 of an antenna 120, can be utilized to help cure the cured composite stack 143. Accordingly, the embedded resistor wire 122 serves the dual purpose of at least partially curing the cured composite stack 143 and forming part of an embedded antenna 120 within the cured composite stack 143. Examples of a method of making the part 113, of which the cured composite stack 143 forms a portion, are described below.

Figure 10:
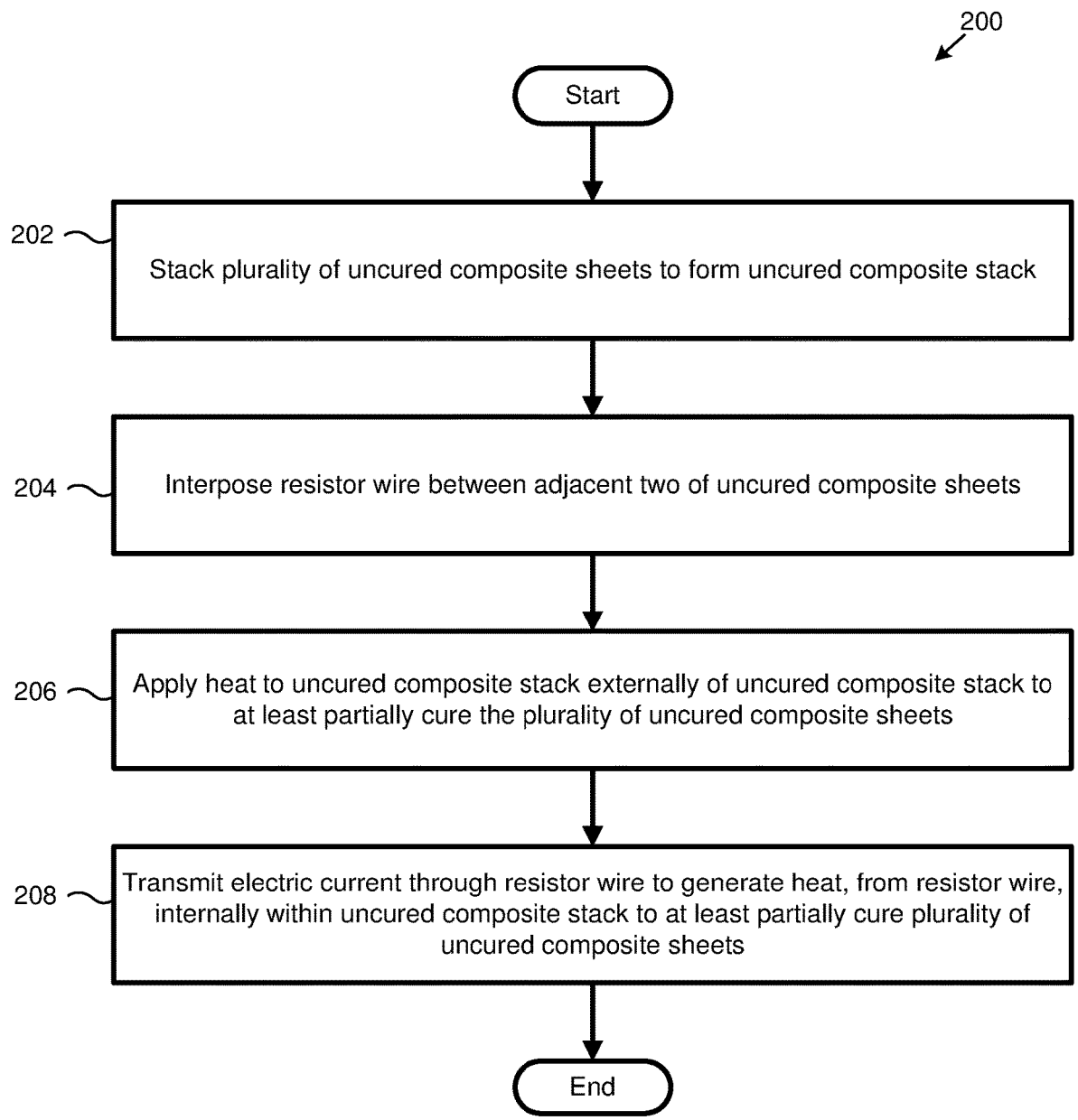
FIG. 10 is a schematic flow chart of a method of making a part, according to one or more examples of the present disclosure.

Referring to FIG. 10, according to one example, a method 200 of making the part 113 includes stacking a plurality of uncured composite sheets 141 to form an uncured composite stack 140 at step 202. The uncured composite sheets 141 are similar to the cured composite sheets 142 except the polymer matrix suspending the fibers of the uncured composite sheets 141 is uncured. In one implementation, the uncured composite sheets 141 are prepreg sheets. The stacking of the plurality of uncured composite sheets 141 at step 202 may include orienting the uncured composite sheets 141 relative to each other such that the orientation of the fibers of the uncured composite sheets 141 alternate from sheet to sheet in the uncured composite stack 140.

Figure 5:
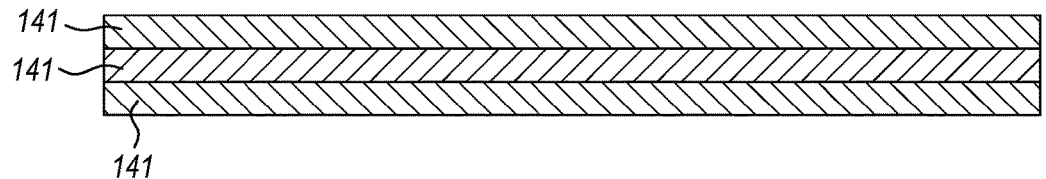
FIG. 5 is a cross-sectional side elevation view of a portion of an uncured composite stack, according to one or more examples of the present disclosure.
Figure 6:
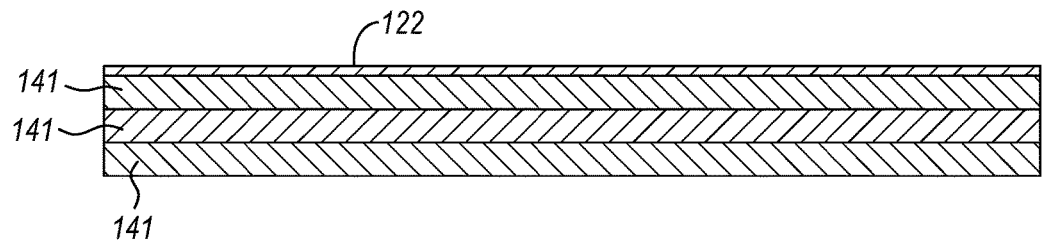
FIG. 6 is a cross-sectional side elevation view of the portion of the uncured composite stack of FIG. 5 with a resistor wire on the portion of the uncured composite stack, according to one or more examples of the present disclosure.
Figure 7:
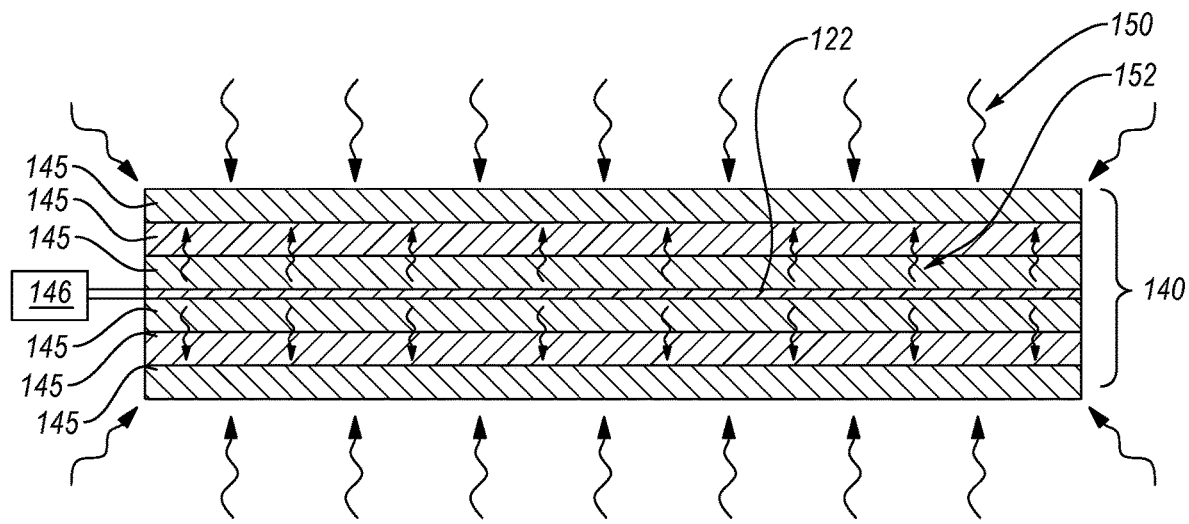
FIG. 7 is a cross-sectional side elevation view of an uncured composite stack undergoing a curing process, according to one or more examples of the present disclosure.

The method 200 also includes interposing a resistor wire 122 between an adjacent two of the uncured composite sheets 141 of the uncured composite stack 140 at step 204 of FIG. 10. The resistor wire 122 is interposed between the adjacent two of the uncured composite sheets 141 such that the resistor wire 122 extends an entire length of the uncured composite stack 140. Referring to FIG. 5, stacking the plurality of uncured composite sheets 141 at step 202 may include stacking less than all of the plurality of uncured composite sheets 141 to form just a portion of the uncured composite stack 140. Then, referring to FIG. 6, interposing the resistor wire 122 includes applying the resistor wire 122 onto the portion of the uncured composite stack 140. Finally, referring to FIG. 7, the remaining uncured composite sheets 141 of the plurality of uncured composite sheets 141 are stacked onto the portion of the uncured composite stack 140 to complete step 202 of the method 200 and stacked onto the resistor wire 122 to complete step 204 of the method 200.

At step 206 of the method 200 of FIG. 10, heat 150 is applied to the uncured composite stack 140 externally of the uncured composite stack 140 to at least partially cure the plurality of uncured composite sheets 141. Referring back to FIG. 7, the heat 150 radiates into the uncured composite stack 140 from outside of the uncured composite stack 140. The heat 150 can be generated using various techniques, such as via an oven or an autoclave. Because the heat 150 originates from outside the uncured composite stack 140, the uncured composite stack 140 may cure at different rates with portions of the uncured composite stack 140 closer to the exterior of the stack curing faster than portions of the uncured composite stack 140 further away from the exterior of the stack. The difference in curing rates may lead to non-uniform curing of the part 113, which can weaken the part 113. Generally, the difference in curing rates can be caused by the creation of a temperature gradient through the part. Such a temperature gradient can be accentuated by non-uniform convection rates around the uncured composite stack 140 and non-uniform thicknesses of the uncured composite stack 140.

Non-uniform curing rates can be reduced by reducing the temperature gradient within the uncured composite stack 140. The temperature gradient within the uncured composite stack 140 can be reduced by generating heat internally within the uncured composite stack 140 while the heat 150 is applied exteriorly of the uncured composite stack 140. According to step 208 of the method 200, heat 152 is generated internally within the uncured composite stack 140 by transmitting an electric current through the resistor wire 122 embedded within the uncured composite stack 140. As the electric current is transmitted through the resistor wire 122, the resistivity of the resistor wire 122 converts electrical energy to thermal energy or heat. The electric current is applied to the resistor wire 122 by an electrical power source 146 electrically coupled to the resistor wire 122.

Figure 8:
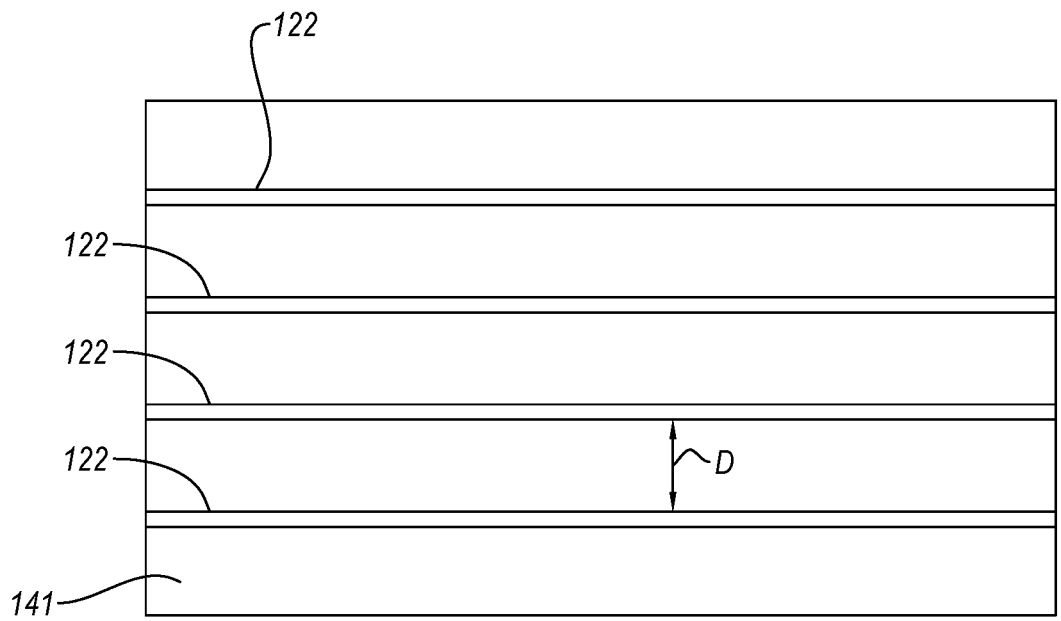
FIG. 8 is a top plan view of the portion of the uncured composite stack and resistor wire of FIG. 6, according to one or more examples of the present disclosure.

In some examples of the method 200, and as shown in FIG. 8, a plurality of resistor wires 122 are interposed between the adjacent two of the uncured composite sheets 141 in a spaced apart manner relative to each other. The resistor wires 122 are spaced apart from each other by a distance D sufficient to prevent electrical shorting between the resistor wires 122. According to one example, the plurality of resistor wires 122 are electrically coupled together in parallel such that electric current applied to one of the resistor wires 122 by the electrical power source 146 is applied concurrently to all of the plurality of resistor wires 122.

The heat 152 generated at step 208 at least partially cures the plurality of uncured composite sheets 141. The at least partial curing by the heat 150 and the at least partial curing by the heat 152 collectively result in a full curing of the uncured composite stack 140. In other words, applying heat 150 to the uncured composite stack 140 externally of the uncured composite stack 140 at step 206 and generating heat 152 internally within the uncured composite stack 140 at step 208 converts the plurality of uncured composite sheets 141 into a plurality of cured composite sheets 142 and converts the uncured composite stack 140 into a cured composite stack 143.

After the uncured composite stack 140 is cured to form the cured composite stack 143, the method 200 includes severing the resistor wire 122, while in place between the adjacent two of the cured composite sheets 142 of the cured composite stack 143, at a first location to define the first end 160 of the antenna portion 124 of the resistor wire 122. Severing the resistor wire 122 results in a clean break or completely open gap in the resistor wire 122. In some examples, severing the resistor wire 122 at the first location includes drilling the first hole 126A into the cured composite stack 143 and entirely through the resistor wire 122 at the first location. The first hole 126A can be drilled using mechanical drill bits in one example. In another example, the first hole 126A is drilled using an optical drill, such as a laser drill.

If the second end 162 of the antenna portion 124 is not at the end of the cured composite stack 143 or is not defined by an existing end of the resistor wire 122, the method 200 may also include severing the resistor wire 122, while in place between the adjacent two of the cured composite sheets 142 of the cured composite stack 143, at a second location to define the second end 162 of the antenna portion 124 of the resistor wire 122. Severing the resistor wire 122 at the second location can include drilling the second hole 126B into the cured composite stack 143 and entirely through the resistor wire 122. The second hole 126B can be drilled in a manner similar to the first hole 126A. However, if the second end 162 of the antenna portion 124 is at the end of the cured composite stack 143 or is defined by an existing end of the resistor wire 122, the method 200 does not include severing the resistor wire 122, while in place between the adjacent two of the cured composite sheets 142 of the cured composite stack 143, at a second location.

The method 200 may include severing the resistor wire 122 at additional locations (e.g., third and fourth locations) to form additional antenna portions 124, each associated with a different antenna 120, of the resistor wire 122. The lengths L of the antenna portions 124 of the resistor wire 122 can be different, with each length L corresponding with a different one of multiple predetermined frequencies (e.g., first and second predetermined frequencies).

After, or before, the resistor wire 122 is severed by drilling the first hole 126A and/or the second hole 126B, the method 200 can include drilling the third hole 126C into the cured composite stack 143 up to, or including, the resistor wire 122. The method 200 may also include filling the third hole 126C with the electrical lead 128 and electrically coupling the electrical lead 128 to the antenna portion 124 and the radio receiver 132.

Figure 11:
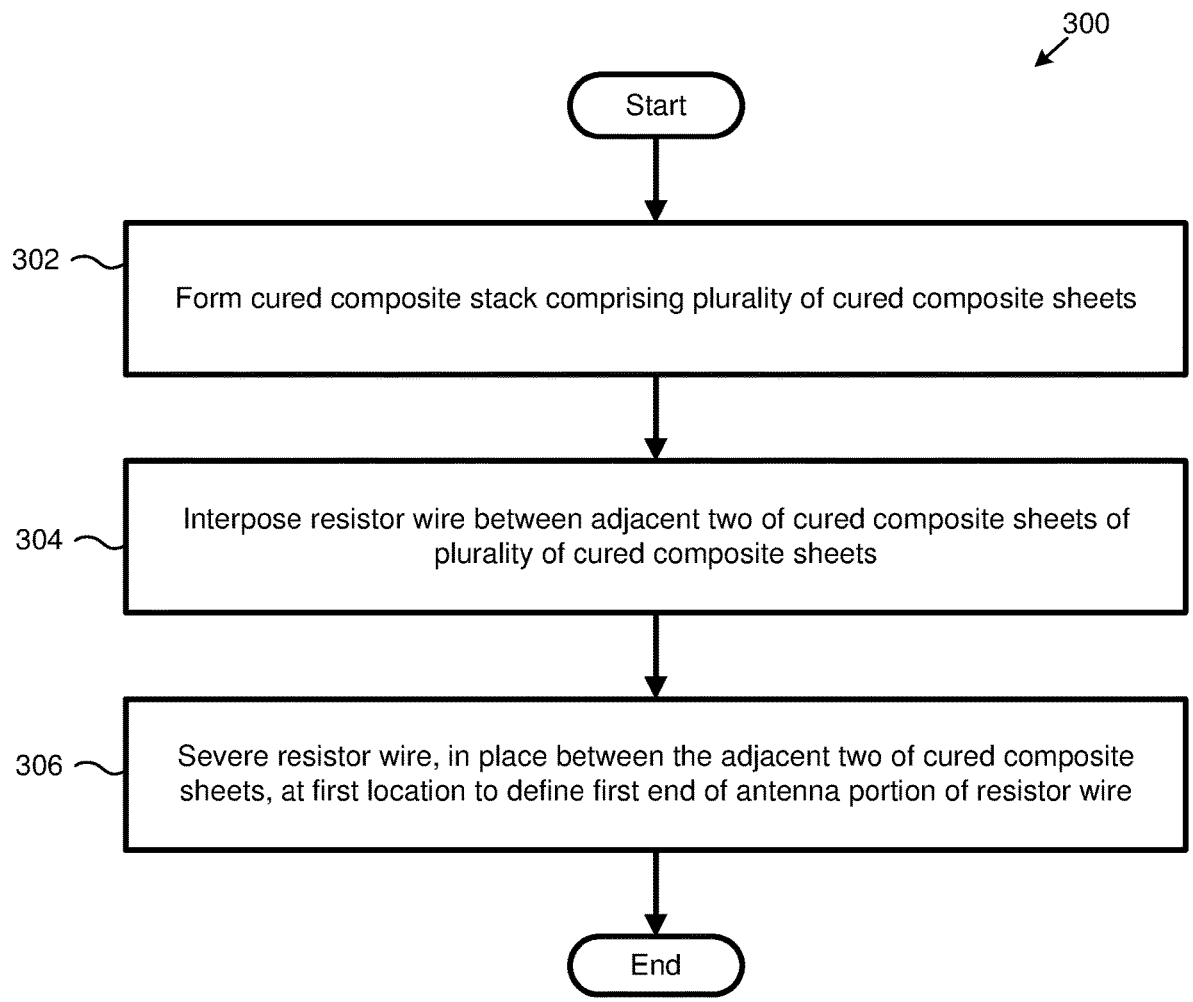
FIG. 11 is a schematic flow chart of another method of making a part, according to one or more examples of the present disclosure.

Referring to FIG. 11, and according to another example, a method 300 of making a part 113 includes forming the cured composite stack 143 at step 302. The method 300 also includes interposing the resistor wire 122 between an adjacent two of the cured composite sheets of the cured composite stack 143 at step 304. At step 306, the method 300 additionally includes severing the resistor wire 122, in place between the adjacent two of the cured composite sheets 142 of the cured composite stack 143, at a first location to define the first end 160 of the antenna portion 124 of the resistor wire 122. Severing the resistor wire 122 can include drilling the first hole 126A and filling the first hole 126A with the plug 144. Alternatively, the resistor wire 122 may already be at an appropriate length, such that drilling the first hole 126A is replaced with drilling a third hole 126C (at least partially through the resistor wire 122) that is filled with the electrical lead 128. In this latter implementation, the existing resistor wire 122 is not shortened to form the antenna portion 124. Accordingly, in some implementations, the method 300 is executed to form an original antenna 120 in the cured composite stack 143.

However, in other implementations, the method 300 is executed to retrofit an existing antenna 120 embedded in the cured composite stack 143. For example, the antenna portion 124 of an existing resistor wire 122 can be shortened by severing the antenna portion 124 to create a new antenna portion 124 with a shorter length L. The shorter length L of the new antenna portion 124 modifies the antenna 120 to receive a radio wave signal having a different frequency.

In the above description, certain terms may be used such as "up," "down," "upper," "lower," "horizontal," "vertical," "left," "right," "over," "under" and the like. These terms are used, where applicable, to provide some clarity of description when dealing with relative relationships. But, these terms are not intended to imply absolute relationships, positions, and/or orientations. For example, with respect to an object, an "upper" surface can become a "lower" surface simply by turning the object over. Nevertheless, it is still the same object. Further, the terms "including," "comprising," "having," and variations thereof mean "including but not limited to" unless expressly specified otherwise. An enumerated listing of items does not imply that any or all of the items are mutually exclusive and/or mutually inclusive, unless expressly specified otherwise. The terms "a," "an," and "the" also refer to "one or more" unless expressly specified otherwise. Further, the term "plurality" can be defined as "at least two." Moreover, unless otherwise noted, as defined herein a plurality of particular features does not necessarily mean every particular feature of an entire set or class of the particular features.

Additionally, instances in this specification where one element is "coupled" to another element can include direct and indirect coupling. Direct coupling can be defined as one element coupled to and in some contact with another element. Indirect coupling can be defined as coupling between two elements not in direct contact with each other, but having one or more additional elements between the coupled elements. Further, as used herein, securing one element to another element can include direct securing and indirect securing. Additionally, as used herein, "adjacent" does not necessarily denote contact. For example, one element can be adjacent another element without being in contact with that element.

As used herein, the phrase "at least one of", when used with a list of items, means different combinations of one or more of the listed items may be used and only one of the items in the list may be needed. The item may be a particular object, thing, or category. In other words, "at least one of" means any combination of items or number of items may be used from the list, but not all of the items in the list may be required. For example, "at least one of item A, item B, and item C" may mean item A; item A and item B; item B; item A, item B, and item C; or item B and item C. In some cases, "at least one of item A, item B, and item C" may mean, for example, without limitation, two of item A, one of item B, and ten of item C; four of item B and seven of item C; or some other suitable combination.

Unless otherwise indicated, the terms "first," "second," etc. are used herein merely as labels, and are not intended to impose ordinal, positional, or hierarchical requirements on the items to which these terms refer. Moreover, reference to, e.g., a "second" item does not require or preclude the existence of, e.g., a "first" or lower-numbered item, and/or, e.g., a "third" or higher-numbered item.

As used herein, a system, apparatus, structure, article, element, component, or hardware "configured to" perform a specified function is indeed capable of performing the specified function without any alteration, rather than merely having potential to perform the specified function after further modification. In other words, the system, apparatus, structure, article, element, component, or hardware "configured to" perform a specified function is specifically selected, created, implemented, utilized, programmed, and/or designed for the purpose of performing the specified function. As used herein, "configured to" denotes existing characteristics of a system, apparatus, structure, article, element, component, or hardware which enable the system, apparatus, structure, article, element, component, or hardware to perform the specified function without further modification. For purposes of this disclosure, a system, apparatus, structure, article, element, component, or hardware described as being "configured to" perform a particular function may additionally or alternatively be described as being "adapted to" and/or as being "operative to" perform that function.

The schematic flow chart diagrams included herein are generally set forth as logical flow chart diagrams. As such, the depicted order and labeled steps are indicative of one embodiment of the presented method. Other steps and methods may be conceived that are equivalent in function, logic, or effect to one or more steps, or portions thereof, of the illustrated method. Additionally, the format and symbols employed are provided to explain the logical steps of the method and are understood not to limit the scope of the method. Although various arrow types and line types may be employed in the flow chart diagrams, they are understood not to limit the scope of the corresponding method. Indeed, some arrows or other connectors may be used to indicate only the logical flow of the method. For instance, an arrow may indicate a waiting or monitoring period of unspecified duration between enumerated steps of the depicted method. Additionally, the order in which a particular method occurs may or may not strictly adhere to the order of the corresponding steps shown.

The present subject matter may be embodied in other specific forms without departing from its spirit or essential characteristics. The described embodiments are to be considered in all respects only as illustrative and not restrictive. All changes which come within the meaning and range of equivalency of the claims are to be embraced within their scope.

What is claimed is:

1. A method of making an embedded antenna, the method comprising:
    stacking a plurality of uncured composite sheets to form an uncured composite stack;
    interposing a resistor wire between an adjacent two of the uncured composite sheets of the uncured composite stack;
    applying heat to the uncured composite stack externally of the uncured composite stack to at least partially cure the plurality of uncured composite sheets; and
    transmitting an electric current through the resistor wire to generate heat, from the resistor wire, internally within the uncured composite stack to at least partially cure the plurality of uncured composite sheets;
    wherein applying heat to the uncured composite stack externally of the uncured composite stack and generating heat internally within the uncured composite stack converts the plurality of uncured composite sheets into a plurality of cured composite sheets and converts the uncured composite stack into a cured composite stack resulting in the resistor wire forming the embedded antenna within the cured composite stack.

2. The method according to claim 1, wherein the resistor wire spans an entire length of the uncured composite stack.

3. The method according to claim 1, further comprising severing the resistor wire, in place between the adjacent two of the cured composite sheets of the cured composite stack, at a first location to define a first end of an antenna portion of the resistor wire, wherein the antenna portion has a first length less than an entire length of the resistor wire.

4. The method according to claim 3, wherein the first length corresponds with a predetermined frequency of a radio wave signal.

5. The method according to claim 3, wherein severing the resistor wire at the first location comprises drilling a first hole into the cured composite stack and through the resistor wire at the first location.

6. The method according to claim 5, further comprising filling the first hole with a plug made of an electrically non-conductive material.

7. The method according to claim 5, further comprising:
    drilling a third hole into the cured composite stack up to the antenna portion of the resistor wire;
    inserting an electrical lead into the third hole;
    electrically coupling the electrical lead to the antenna portion; and
    electrically coupling the electrical lead to a radio receiver.

8. The method according to claim 3, further comprising severing the resistor wire, in place between the adjacent two of the cured composite sheets of the cured composite stack, at a second location to define a second end of the antenna portion of the resistor wire.

9. The method according to claim 8, wherein severing the resistor wire at the second location comprises drilling a second hole into the cured composite stack and through the resistor wire at the second location.

10. The method according to claim 8, wherein:
the antenna portion is a first antenna portion;
the method further comprises severing the resistor wire, in place between the adjacent two of the cured composite sheets of the cured composite stack, at a third location to define a first end of a second antenna portion and at a fourth location to define a second end of the second antenna portion;
the second antenna portion has a second length different than the first length;
the first length corresponds with a first predetermined frequency of a radio wave signal; and
the second length corresponds with a second predetermined frequency of a radio wave signal, the second predetermined frequency being different than the first predetermined frequency.

11. The method according to claim 1, further comprising:
interposing a plurality of resistor wires between the adjacent two of the uncured composite sheets in a spaced apart manner relative to each other; and
transmitting the electric current concurrently through the plurality of resistor wires to generate heat, from the resistor wires, internally within the uncured composite stack to at least partially cure the plurality of uncured composite sheets.

12. The method according to claim 11, further comprising:
severing a first one of the plurality of resistor wires, in place between the adjacent two of the cured composite sheets of the cured composite stack, at a first location to define a first end of an antenna portion of the first one of the plurality of resistor wires, wherein the antenna portion of the first one of the plurality of resistor wires has a first length less than an entire length of the resistor wire; and
severing a second one of the plurality of resistor wires, in place between the adjacent two of the cured composite sheets of the cured composite stack, at a third location to define a first end of an antenna portion of the second one of the plurality of resistor wires, wherein the antenna portion of the second one of the plurality of resistor wires has a second length less than an entire length of the resistor wire and different than the first length.

13. The method according to claim 1, further comprising:
extending a first hole into the cured composite stack, from only one side of the cured composite stack, and through the resistor wire, wherein the first hole defines a first end of an antenna portion of the resistor wire, the antenna portion is electrically isolated from any other portion of the resistor wire at least partially by the first hole, and the antenna portion has a first length less than an entire length of the resistor wire;
electrically coupling an electrical lead to the resistor wire only at the antenna portion; and
electrically coupling a radio receiver to the electrical lead.

14. The method according to claim 13, further comprising filling the first hole with a plug, made of an electrically non-conductive material.

15. The method according to claim 13, further comprising extending a second hole into the cured composite stack, from only one side of the cured composite stick, and through the resistor wire, wherein the second hole defines a second end of the antenna portion of the resistor wire and the antenna portion is electrically isolated from any other portion of the resistor wire by the first hole and the second hole.

16. The method according to claim 13, wherein the first length corresponds with a predetermined frequency of a radio wave signal.

17. The method according to claim 13, wherein the resistor wire comprises a plurality of antenna portions, electrically isolated from each other, and a plurality of electrical leads each electrically coupled to the resistor wire only at a corresponding one of the plurality of antenna portions, wherein the plurality of electrical leads are electrically coupled to the radio receiver.

18. A method of making an embedded antenna, the method comprising:
forming a cured composite stack comprising a plurality of cured composite sheets;
interposing a resistor wire between an adjacent two of the cured composite sheets of the plurality of cured composite sheets; and
severing the resistor wire, in place between the adjacent two of the cured composite sheets of the cured composite stack, at a first location to define a first end of an antenna portion of the resistor wire resulting in the resistor wire forming the embedded antenna within the cured composite stack, wherein the antenna portion has a first length less than an entire length of the resistor wire;
wherein the first length corresponds with a predetermined frequency of a radio wave signal.

19. The method according to claim 18, wherein severing the resistor wire at the first location comprises drilling a first hole into the cured composite stack and through the resistor wire at the first location.

20. The method according to claim 19, further comprising filling the first hole with a plug made of an electrically non-conductive material.

* * * * *